(12) United States Patent
Nag et al.

(10) Patent No.: US 8,645,205 B2
(45) Date of Patent: Feb. 4, 2014

(54) SYSTEM FOR OPTIMIZING AD PERFORMANCE AT CAMPAIGN RUNNING TIME

(75) Inventors: Biswadeep Nag, Fremont, CA (US); Wei Du, Burbank, CA (US); Charles Wang, Union City, CA (US); Jessi Dong, Saratoga, CA (US); Michael Helman, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 779 days.

(21) Appl. No.: 12/241,726

(22) Filed: Sep. 30, 2008

(65) Prior Publication Data

US 2010/0082423 A1 Apr. 1, 2010

(51) Int. Cl.
*G06Q 30/00* (2012.01)

(52) U.S. Cl.
USPC ........................... 705/14.43; 705/14.4

(58) Field of Classification Search
None
See application file for complete search history.

(56) References Cited

U.S. PATENT DOCUMENTS

| | | | | |
|---|---|---|---|---|
| 2002/0046099 A1* | 4/2002 | Frengut et al. | | 705/14 |
| 2002/0078441 A1* | 6/2002 | Drake et al. | | 725/9 |
| 2003/0101454 A1* | 5/2003 | Ozer et al. | | 725/42 |
| 2004/0133469 A1* | 7/2004 | Chang | | 705/14 |
| 2005/0088407 A1* | 4/2005 | Bell et al. | | 345/156 |
| 2005/0251824 A1* | 11/2005 | Thomas et al. | | 725/42 |
| 2006/0085408 A1* | 4/2006 | Morsa | | 707/3 |
| 2006/0236257 A1* | 10/2006 | Othmer et al. | | 715/774 |
| 2007/0027768 A1* | 2/2007 | Collins et al. | | 705/14 |
| 2007/0050372 A1* | 3/2007 | Boyle | | 707/10 |
| 2007/0067241 A1* | 3/2007 | Malik | | 705/51 |
| 2007/0083885 A1* | 4/2007 | Harding | | 725/34 |
| 2007/0111712 A1* | 5/2007 | Ratnakar | | 455/414.1 |
| 2007/0244750 A1* | 10/2007 | Grannan et al. | | 705/14 |
| 2007/0265923 A1* | 11/2007 | Krassner et al. | | 705/14 |
| 2007/0294096 A1* | 12/2007 | Randall et al. | | 705/1 |
| 2008/0040329 A1* | 2/2008 | Cussen et al. | | 707/3 |
| 2008/0098420 A1* | 4/2008 | Khivesara et al. | | 725/32 |
| 2008/0249841 A1* | 10/2008 | Ruark et al. | | 705/10 |
| 2009/0063274 A1* | 3/2009 | Dublin et al. | | 705/14 |
| 2009/0163227 A1* | 6/2009 | Collins | | 455/456.3 |
| 2009/0197616 A1* | 8/2009 | Lewis et al. | | 455/456.1 |
| 2009/0199114 A1* | 8/2009 | Lewis et al. | | 715/763 |
| 2010/0017280 A1* | 1/2010 | Davis et al. | | 705/14.4 |
| 2010/0036806 A1* | 2/2010 | Lam et al. | | 707/3 |
| 2011/0119137 A1* | 5/2011 | Morsa | | 705/14.71 |

* cited by examiner

*Primary Examiner* — Matthew T Sittner
(74) *Attorney, Agent, or Firm* — Brinks Gilson & Lione

(57) ABSTRACT

A system and method are disclosed for optimizing the performance of an advertisement. The advertisement may be targeted based on correlations between advertisements and/or users. The correlations may be used to improve the click-through rate of advertisements. As data is collected and feedback is received, the correlation between ads and users may be updated, so that an advertiser's campaign can optimize its targeting of users.

20 Claims, 4 Drawing Sheets

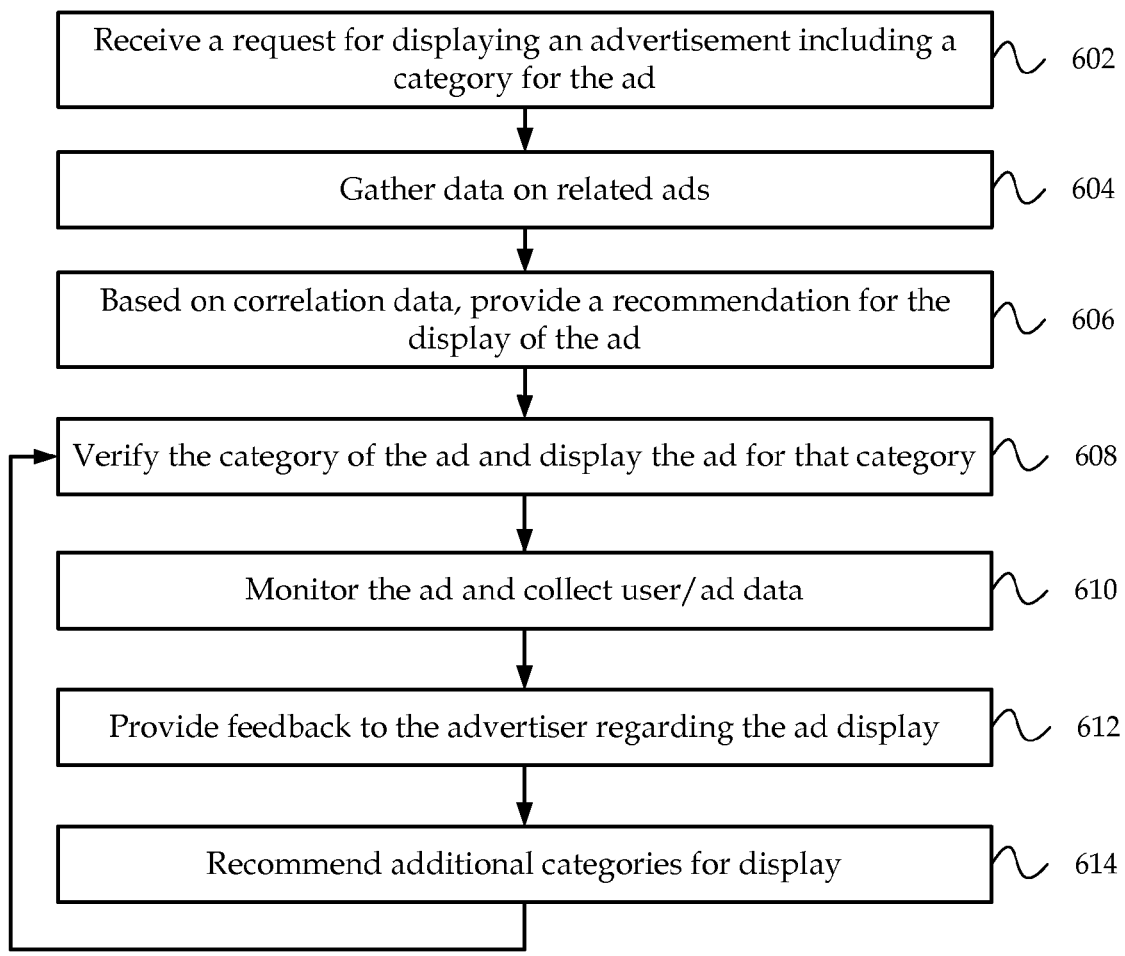

SYSTEM FOR OPTIMIZING AD PERFORMANCE AT CAMPAIGN RUNNING TIME

BACKGROUND

Online advertising may be an important source of revenue for enterprises engaged in electronic commerce. Processes associated with technologies such as Hypertext Markup Language (HTML) and Hypertext Transfer Protocol (HTTP) enable a web page to be configured to display advertisements. Advertisements may commonly be found on many web sites. For example, advertisements may be displayed on search web sites and may be targeted to individuals based upon search terms provided by the individuals. Other web site publishers, such as news and sports web sites, may provide space for advertisements. The publishers of these web sites may sell advertising space to advertisers to defray the costs associated with operating the web sites as well as to obtain additional revenue.

As the Internet has grown, the number of web sites available for hosting advertisements has increased, as well as the diversity among web sites. In other words, the number of web sites focusing on selective groups of individuals has increased. As a result of this increase, it has become increasingly difficult for advertisers to optimize the targeting of their advertisements. Advertisers may be unfamiliar with the vast number of web sites available for hosting advertisements and may choose to host their respective advertisements on a less than optimal host web site. Likewise, advertisers may be unfamiliar with the most effective ways to target their advertisements. This may result in a lower rate of return for the advertiser. That advertiser may have received a greater rate of return had the advertiser targeted his advertisement more effectively.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 6 is flowchart of exemplary ad optimization.

DETAILED DESCRIPTION

By way of introduction, advertisement performance may be optimized by utilizing correlations between ads. The correlation between ads may be based on profile data, accounting data, user click through behaviors, tags, or other ad based meta data. A correlation between different users may be combined with ad correlation data to improve ad targeting. In particular, the correlation between ads, between users, or between ads and users may identify the circumstances in which an ad is most likely to be successful.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Figure 1:
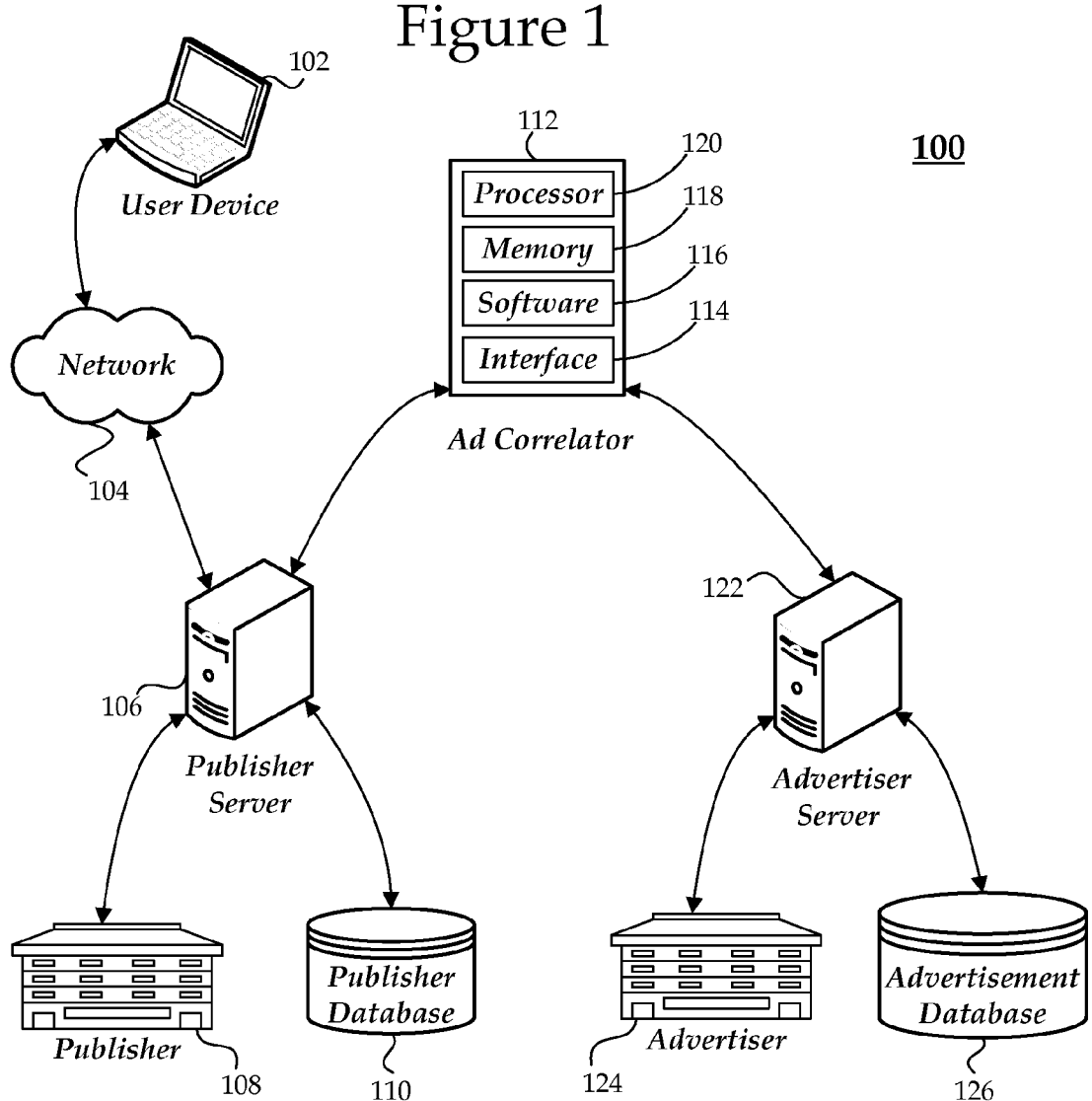
FIG. 1 is a diagram of an exemplary network system.

FIG. 1 depicts a block diagram illustrating one embodiment of an exemplary advertising system 100. The advertising system 100 may provide a platform for the identification, selection, analysis, and display of advertisements included in pages, such as web pages. In the advertising system 100, a user device 102 is coupled with a publisher server 106 through a network 104. The publisher server 106 may be operated by and/or coupled with a publisher 108, as well as being coupled with a publisher database 110. An advertiser server 122 coupled with an advertiser 124 may also be coupled with an advertisement database 126. An ad correlator 112 may be coupled with the publisher server 106 and the advertiser server 122. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The user device 102 may be a computing device which allows a user to connect to a network 104, such as the Internet. Examples of a user device include, but are not limited to, a personal computer, personal digital assistant ("PDA"), cellular phone, or other electronic device. The user device 102 may be configured to allow a user to interact with the publisher server 106 or other components of the advertising system 100. The user device 102 may include a keyboard, keypad or a cursor control device, such as a mouse, or a joystick, touch screen display, remote control or any other device operative to allow a user to interact with the publisher server 106 via the user device 102. In one embodiment, the user device 102 is configured to request and receive information from the publisher server 106, such as a web page that is provided by the publisher 108. The user device 102 may be configured to access other data/information in addition to web pages over the network 104 using a web browser, such as INTERNET EXPLORER® (sold by Microsoft Corp., Redmond, Wash.) or FIREFOX® (provided by Mozilla). The data displayed by the browser may include advertisements. In an alternative embodiment, software programs other than web browsers may also display advertisements received over the network 104 or from a different source.

In one embodiment, the publisher server 106 provides an interface to a network 104 and/or provides a web page to the user device 102. The publisher server 106 may be a web server that provides the user device 102 with pages (including advertisements) that are requested by a user of the user device 102. In particular, the publisher 108 may provide a web page, or a series of web pages that are provided by the publisher server 106 when requested from the user device 102. For example, the publisher may be a news organization, such as CNN® that provides all the pages and sites associated with www.cnn.com. Accordingly, when the user device 102 requests a page from www.cnn.com, that page is provide over the network 104 by the publisher server 106. As described below, that page may include advertising space or advertisement slots that are filled with advertisements viewed with the page on the user device 102. The publisher server 106 may be operated by a publisher 108 that maintains and oversees the operation of the publisher server 106.

The publisher 108 may be any operator of a page displaying advertisements that receives a payment from the advertisers of those advertisements. The publisher 108 may oversee the publisher server 106 by receiving advertisements from an advertiser server 122 that are displayed in pages provided by the publisher server 106. In one embodiment, an ad correlator 112 may be used by the publisher 108 to analyze and categorize advertisements to be displayed based on correlations between ads and between users. The ad correlator 112 may be used by the advertiser 124 for targeting its ads based on the analyzed correlations.

The publisher database 110 may be coupled with the publisher server 106 and may store the publisher's pages or data that is provided by the publisher server 106. In addition, the publisher database 110 may include records or logs of at least a subset of the requests for data/pages submitted to the publisher server 106 over a period of time. In one example, the publisher database 110 may include a history of Internet browsing data related to the pages provided by the publisher server 106. The data stored in the publisher database 110 may relate to or include various user information, such as preferences, interests, profile information or browsing tendencies, and may include the number of impressions and/or number of clicks on particular advertisements. The publisher database 110 may store advertisements from a number of advertisers, such as the advertiser 124. In addition, the publisher database 110 may store records on the advertisements that are shown and the resulting impressions, clicks, and/or actions taken for those advertisements. The data related to advertisement impressions, clicks and resulting actions may be stored in either the publisher database 110 and/or an advertiser database 126. The ad data, along with the user profile data, may be used by the ad correlator 112 for targeting current and future ads. The data may be continuously updated to reflect current viewing, clicking, and interaction with the advertisements displayed on the user device 102.

The advertiser server 122 may provide advertisements for display in web pages, such as the publisher's pages. The advertiser 124 may be any operator of the advertiser server 122 for providing advertisements. The advertisements may relate to products and/or services provided by the advertiser 124. The advertiser 124 may pay the publisher 108 for advertising space on the publisher's page or pages. The advertiser 124 may oversee the advertiser server 122 by providing advertisements to the publisher server 106.

The advertisements, their usage data, as well as user profile data, may be analyzed by the ad correlator 112. The ad correlator 112 may be coupled with the publisher server 106 and the advertiser server 122 for correlating ads or users for effective targeting of those ads. In one embodiment, the ad correlator 112 may be controlled by the publisher 108 and may be a part of the publisher server 106. Alternatively, the ad correlator 112 may be controlled by the advertiser 124 and may be a part of the advertiser server 122, or may be part of a separate entity. The advertiser server 122 may act as an interface for the advertiser 124 to provide advertisements to the ad correlator 112. Likewise, the publisher server 106 may utilize the ad correlator 112 to optimize its available ad space by identifying those ads that are most likely to be effective. The ad correlator 112 may analyze ads and users, as well as usage and profile data for both ads and users to identify relationships between successful or profitable advertisements. The correlation analysis and correlation factors are described below with respect to FIG. 3 and FIG. 4.

The ad correlator 112 may receive advertisements from a number of advertisers, such as the advertiser 124. Those advertisements may be correlated by the ad correlator 112 to determine similarities between the ads. In one embodiment, the advertiser 124 may receive correlation data for its advertisements from the ad correlator 112. For example, the ads may be categorized, and those categories may be used by the publisher 108 for identifying appropriate advertisement space for that category. Correlation data may be used to identify additional categories that would be appropriate for the ad. The correlation data may identify ads or ad groups that are similar, such that when one of the ads is successful in a certain context, it may be inferred that a similar ad may be successful in that context. The context may include the ad position, ad location, ad type, source page, or targeted user, as discussed below.

The ad correlator 112 may be a computing device for monitoring and analyzing ads and users that identifies correlationships between ads or users that can be used for targeting of those ads. The ad correlator 112 may include a processor 120, memory 118, software 116 and an interface 114. The ad correlator 112 may be a separate component from the publisher server 106 and/or the advertiser server 122, or may be combined as a single component or device. For example, the publisher 108 may also control and operate the ad correlator 112, which may be combined with the publisher server 106.

The interface 114 may communicate with any of the user device 102, the publisher server 106, and/or the advertiser server 122. The interface 114 may include a user interface configured to allow a user and/or administrator to interact with any of the components of the ad correlator 112. For example, the administrator and/or user may be able to edit, add or remove items from a trail or update usage statistics that are used by the ad correlator 112.

The processor 120 in the ad correlator 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program, such as code generated manually (i.e., programmed).

The processor 120 may be coupled with a memory 118, or the memory 118 may be a separate component. The interface 114 and/or the software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory 118 is operable to store instructions executable by the processor 120.

The functions, acts or tasks illustrated in the figures or described herein may be performed by the programmed processor executing the instructions stored in the memory 118. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The processor 120 is configured to execute the software 116. The software 116 may include instructions for analyzing and identifying a correlation.

The interface 114 may be a user input device or a display. The interface 114 may include a keyboard, keypad or a cursor control device, such as a mouse, or a joystick, touch screen display, remote control or any other device operative to interact with the ad correlator 112. The interface 114 may include a display coupled with the processor 120 and configured to display an output from the processor 120. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing input parameters. In particular, the interface 114 may allow a user to interact with the ad correlator 112 to view or modify the correlation analysis.

The present disclosure contemplates a computer-readable medium that includes instructions or receives and executes instructions responsive to a propagated signal, so that a device connected to a network can communicate voice, video, audio, images or any other data over a network. The interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the advertising system 100 may be coupled with one another through a network, including but not limited to the network 104. For example, the ad correlator 112 may be coupled with the publisher server 106 and/or the advertiser server 122 through a network. As another example, the advertiser database 126 may be coupled with the publisher server 106 and/or the ad correlator 112 through a network. Accordingly, any of the components in the advertising system 100 may include communication ports configured to connect with a network.

The network or networks that may connect any of the components in the advertising system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another. For example, the ad publisher server 112 or the publisher server 106 may provide advertisements and/or content to the user device 102 over a network, such as the network 104.

The publisher server 106, the publisher database 110, the ad correlator 112, the advertiser server 122, the advertiser database 126, and/or the user device 102 may represent computing devices of various kinds. Such computing devices may generally include any device that is configured to perform computation and that is capable of sending and receiving data communications by way of one or more wired and/or wireless communication interfaces, such as interface 114. For example, the user device 102 may be configured to execute a browser application that employs HTTP to request information, such as a web page, from the publisher server 106. The present disclosure contemplates the use of a computer-readable medium that includes instructions or receives and executes instructions responsive to a propagated signal, so that any device connected to a network can communicate voice, video, audio, images or any other data over a network.

Figure 2:
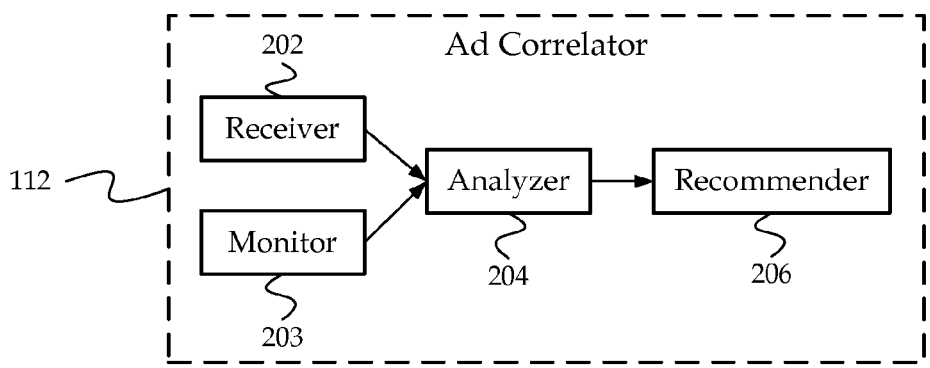
FIG. 2 is a diagram of an exemplary ad correlator.

FIG. 2 is a diagram of an exemplary ad correlator 112. A receiver 202 and a monitor 203 are coupled with an analyzer 204, which is coupled with a recommender 206. The receiver 202 is configured to receive a request for an advertising campaign and/or at least one advertisement from an advertiser 124. The advertising campaign may include at least one advertisement, as well as categories for the advertisements. The categories may be used by the advertiser 124 and the publisher 108 for matching advertisements with available ad space. For example, on a finance related page, a credit card advertisement may be displayed and the category for both may be business or finance. Likewise, an auto insurance advertisement may be displayed on a car page. When the advertiser 124 submits an advertisement, the advertiser 124 may provide additional information to the receiver 202 regarding the advertisement including a category.

The monitor 203 may track the displaying of advertisements. The monitor 203 may record the popularity, click-through rate (CTR), or other ad tracking metrics. In one embodiment, the popularity may include the CTR and may be recorded for different ad locations. That data may be recorded, such as in the advertisement database 126. The monitored data may be provided to the analyzer 204 along with the initial data provided from the receiver 202. The monitored data may be used to update an advertising campaign based on the success and popularity of the advertisement or similar advertisements.

Figure 3:
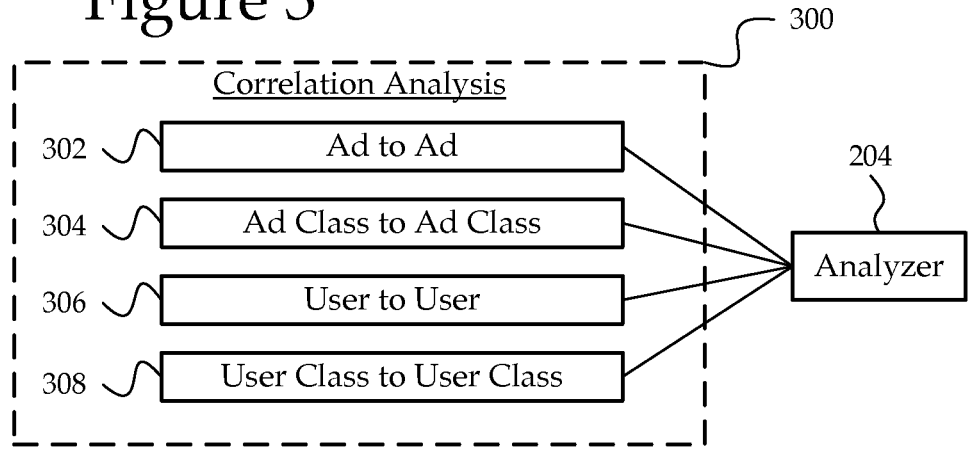
FIG. 3 is a diagram of an exemplary ad correlation analyzer.

The analyzer 204 determines a correlation among users and/or advertisements based on initial purchase data from the receiver 202 and based on the monitored data from the monitor 203. FIG. 3 is a diagram of ad correlation analysis 300 by the analyzer 204. The ad correlation analysis may be performed by the analyzer 204 based on the information from the receiver 202 and/or the monitor 203. The correlation analysis 300 may include an ad to ad correlation 302. The ad to ad correlation 302 compares individual ads to identify similarities between ads. Conversely, the ad class to ad class correlation 304 compares groups or classes of ads to identify similarities between the groups/classes. The ad grouping may be referred to as clustering and includes identifying criteria for individual ads and comparing that criteria to identify ads that are similar and may be grouped. The criteria may include any of the correlation factors 400 discussed below. In addition, the correlations may be based on any of the correlation factors described with respect to FIG. 4. Further the correlations are described in commonly owned U.S. patent application Ser. No. 12/163,114, entitled "SYSTEM TO CORRELATE ONLINE ADVERTISEMENT," and filed Jun. 27, 2008, the entire disclosure of which is hereby incorporated by reference.

Figure 4:
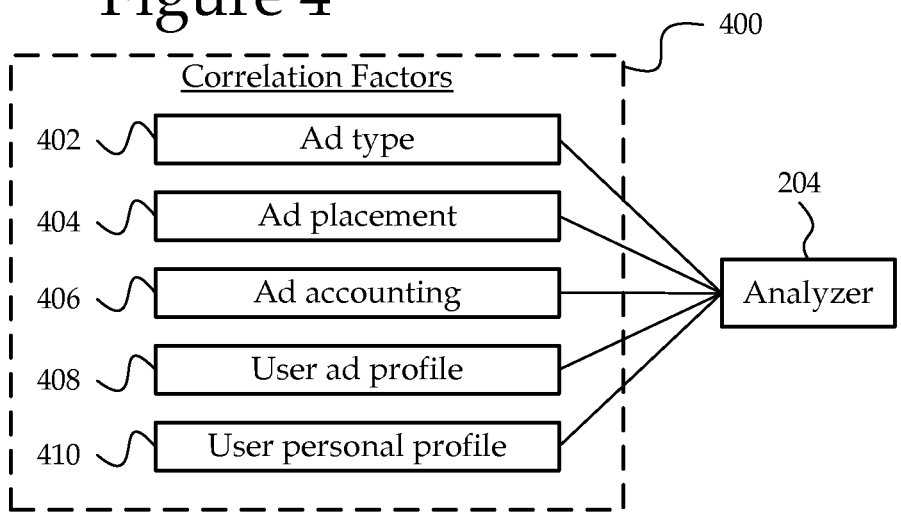
FIG. 4 is a diagram of exemplary ad correlation factors.

FIG. 4 is a diagram of exemplary ad correlation factors 400. The ad correlation factors 400 may be considerations for determining correlations between ads and/or users. The ad type factor 402 may include whether the ad is an image, text, video, audio, flash, interactive (rich) media/standard media, or other multimedia. The ad type may include the name of the advertiser, and/or other ad or ad campaign information such as the dates of the campaign. The ad placement factor 404 may include the ad location. For example, the ad placement may include a banner ad or a sidebar ad. The ad accounting factor 406 may include the popularity, click history, the impression goal, the advertising budget, and/or how advertisement revenue is generated, such as cost per click (CPC) or cost per mile (CPM).

The user ad profile factor 408 may be an advertisement profile for each user to whom the ad may be displayed. The user ad profile may include user behavior with regard to ads for tracking the advertising features each user may be more likely to respond. Additionally, data about the time of day, colors, shopping items, webpage content, and purchase data as they relate to advertisement interaction may be included with the profile.

The user personal profile factor 410 may include a compilation of user personal profile data received from accessible personal profiles of users that may click through an advertisement. For example, a personal profile 410 may track the number of women who click through a particular advertisement. In addition to gender, the personal profile may keep track of average age, zip code, email address, occupation, income level, industry, ethnographic information, purchase history, and/or personal interests of users that click through a particular advertisement. Each of these may be analyzed to generate a personal profile 410 as a compiled personal profile of all users that clicked through a particular advertisement. Accordingly, that profile information may be correlated to the particular advertisement, so that a similar user is also targeted with the successful advertisement.

Referring back to FIG. 3, the correlation analysis 300 may include a user to user correlation 306, or a user class to user class correlation 308. The user correlations may be based on the user ad profile 408 and/or the user personal profile 410. The correlation may be based on a comparison of groups of users through the user class to user class correlation 308. In alternate embodiments, clustering may be used for grouping. The clustering may include algorithms, such as hierarchical agglomerative clustering, K-means clustering, and/or self-organizing maps in addition to similarity identification techniques, such as Euclidean distance and/or Pearson linear correlation.

Referring back to FIG. 2, the analyzer 204 is coupled with a recommender 206. The recommender 206 receives the correlation analysis from the analyzer 204 to generate a correlation recommendation for optimal ad targeting. In one embodiment, a user who is browsing a publisher's 108 site may be targeted by correlating ads that the user has clicked on previously with current ads that are available to be displayed. Alternatively, the correlation may determine similar users, such that ads that were clicked on by the similar users are targeted based on the correlation. Accordingly, the recommender 206 provides an ad recommendation. The recommender 206 may also recommend to the advertiser 124 that a particular advertisement should be categorized differently.

Figure 5:
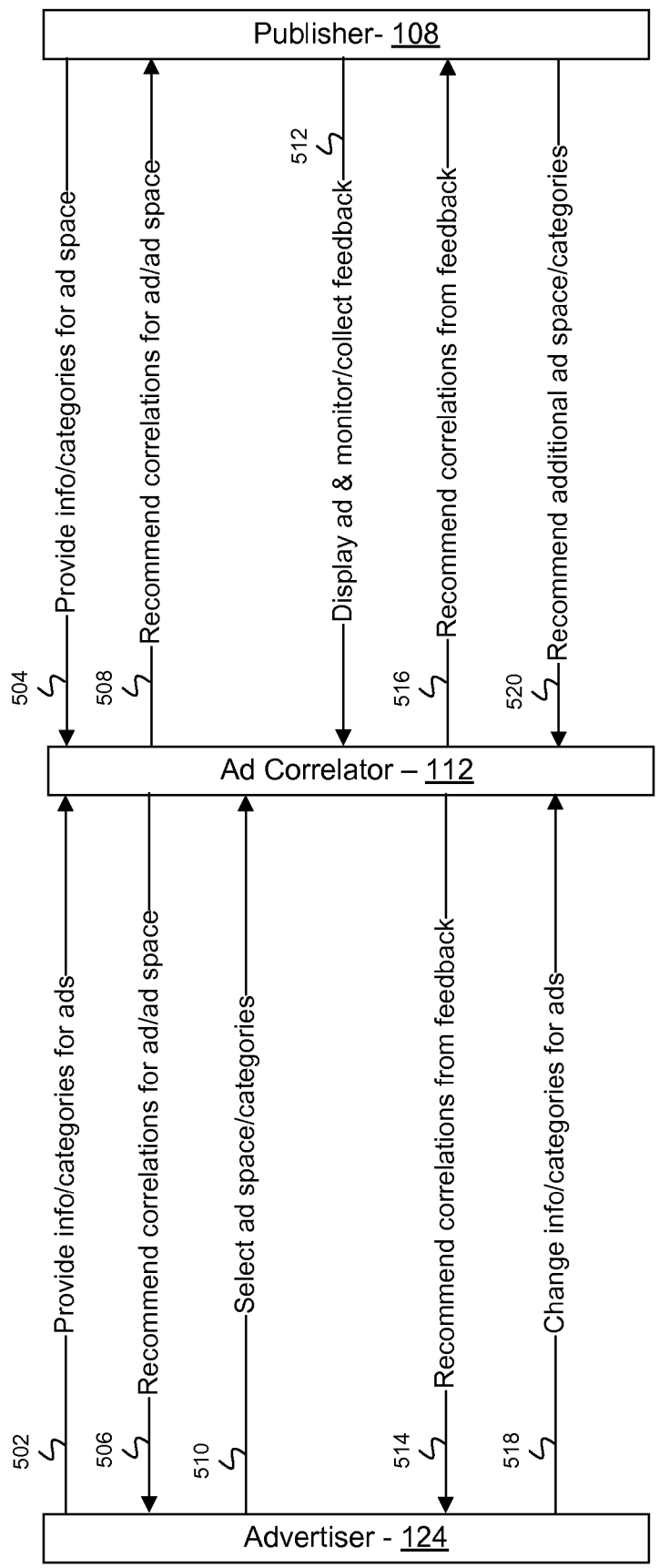
FIG. 5 is a diagram of an exemplary advertising interaction.

FIG. 5 is a diagram of an exemplary advertising interaction. In particular, FIG. 5 illustrates communication among the advertiser 124, the ad correlator 112, and the ad publisher 108. The advertiser 124 (through the ad server 122) requests an advertisement be displayed by or at the publisher's 108 sites. The request may be for an advertisement campaign that includes one or more advertisements to be displayed. For simplicity, the example of a single advertisement will be described.

In block 502, the request from the advertiser 124 to display an advertisement includes information and/or a category for the advertisement. The information also may include any of the correlation factors 400 discussed above. The category may be used by the publisher 108 for matching the ad with appropriate ad space that corresponds to the selected category as in block 504. The correlation factor information may be used by the ad correlator 112 to provide a recommendation for the ad from the advertiser 124 as in block 506 and for the ad space from the publisher 108 as in block 508. The recommendation may include a category for displaying the ad, other ads that may be displayed, or may include available ad space in which an ad may be displayed. For example, an ad for a computer may be categorized as technology and matched with pages that are related to technology, such as a blog related to new devices. Any of the information from the correlation factors 400 may be used by the ad correlator 112 for identifying correlations betweens ads and/or users for providing recommendations on which ads to display to which users. The correlation may relate to the type of website and available ad space rather than a specific user because the class of users that visit the website may be known. Accordingly, the advertisement may be matched by the ad correlator 112 with a particular ad space based on the category and/or additional correlation information in block 510.

Once the advertisement is displayed, the site may monitor its views and click-throughs, as well as the source of those views/click-throughs. Likewise, similar groups of ads that are displayed may also be monitored for collecting popularity data. Based on the monitoring data, the advertisement and/or similar ads may be more popular or successful based on the site, ad space, and/or user type. This information may be recorded in either the publisher database 110 or the advertisement database 126 and used as a correlation factor 400. This real-time monitoring of an advertisement may be used by the ad correlator 112 to update the recommendations it provided initially regarding the display of the advertisement.

A recommendation may be provided to the advertiser 124 as in block 514. The recommendation may include additional categories based on the correlation data. The additional categories may be used for identifying additional ad space for displaying the advertisement that is likely to result in a successful (high CTR) display of the advertisement. Based on the recommendation the advertiser 124 may modify the category and/or other ad information related to the advertisement as in block 518.

A recommendation may be provided to the publisher 108 as in block 516. The recommendation to the publisher 108 may also include additional ad space in which the advertisement may be successful, as well as similar advertisements that are likely to be successful in the ad space. Based on the recommendation the publisher 108 may modify the category and/or other ad space information related to the ad space that is available as in block 520.

Accordingly, the real-time monitoring of an advertisement may be used to gather feedback information, such as the information in the correlation factors 400, which is used to optimize the targeting of advertisements. The real-time monitoring data may help the advertiser 124 and the publisher 108 identify the correlations between ads and ad space that can increase the CTR and profitability of the advertising.

FIG. 6 is flowchart of exemplary ad optimization. In block 602, the advertiser 124 requests one of its ads be displayed. The request may include a category for the advertisement. In block 604, related ad information may be gathered. In addition, information for available ad space may also be gathered. In block 606, correlation data is developed based on the related ad information. The correlation data may consider when the related ads were successful and when they were not successful. A recommendation may be made that the advertisement be displayed on sites or in ad space in which related ads have been successful. Based on the recommendation, the ad may be displayed in an ad space based on the correlation data and/or the provided category as in block 608.

The advertisement is monitored and tracked as it is displayed as in block 610. The monitoring may include the CTR of the advertisement, as well as user information regarding who made the click-throughs. Based on the monitoring, feedback may be provided to the advertiser 124 in real-time as in block 612. The feedback may include recommendations for alternative sites/ad space/categories for displaying the advertisement. In addition, the feedback may include recommendations of where to advertise with future ad campaigns and future advertisements. In one embodiment, the recommendation is an additional category for displaying the advertisement in block 614. Based on the recommended additional category, the advertisement may be displayed in a different or additional category as in block 608. The monitoring process in the new category continues in blocks 610-614.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A computerized method for optimizing performance of an advertisement comprising:
receiving the advertisement for display as part of an advertisement campaign;
collecting previous usage data from previous displays of the advertisement and previous displays of related advertisements;
monitoring current usage data for the advertisement as part of the advertisement campaign, wherein the previous usage data and the current usage data comprise a popularity of the advertisement when displayed at particular locations and when displayed at particular times;
correlating, with a processor, the previous usage data, the current usage data, and user information, wherein the correlation comprises a comparison of the previous usage data and the current usage data in view of the user information; and
categorizing the advertisement based on the correlation.

2. The method of claim 1 wherein the categorizing is updated as additional usage data for the advertisement as part of the advertisement campaign is received.

3. The method of claim 1 wherein the user information comprises demographics, geography, behavior, browsing, ad clicks, purchase history, or combinations thereof.

4. The method of claim 1 further comprising modifying the advertisement campaign based on the correlation of usage data for the advertisement.

5. The method of claim 4 wherein modifying the advertisement campaign comprises displaying the advertisement in a different location.

6. The method of claim 4 wherein modifying the advertisement campaign comprises displaying a different advertisement as part of the advertisement campaign.

7. The method of claim 1 further comprising optimizing a display of the advertisement by displaying the advertisement in a location related to the categorization.

8. A computerized method for correlating advertisements comprising:
receiving an advertisement for display and information related to the advertisement;

correlating, with a processor, the advertisement information with usage data to recommend a location for displaying the advertisement, wherein the correlating further comprises:
- identifying related advertisements to the advertisement for display;
- comparing usage data from the related advertisements and locations where the related advertisements are displayed with the advertisement for display;
- listing the related advertisement locations with each location's popularity; and
- selecting the location for displaying the advertisement as the related advertisement location with the highest popularity;

monitoring the display of the advertisement and updating the usage data as the display of the advertisement is monitored;

updating the correlation based on the updated usage data; and providing a recommendation based on the updated correlation.

9. The method of claim 8 wherein the recommendation comprises a different location for displaying the advertisement.

10. The method of claim 8 wherein the recommendation comprises a different advertisement for displaying at the location.

11. The method of claim 8 wherein the usage data comprises ad impressions.

12. The method of claim 8 wherein the usage data comprises a click-through rate (CTR) at different locations, further wherein the updating the usage data comprises updating the CTR at the different locations.

13. The method of claim 12 wherein the recommendation comprises identifying a location from the different locations with a successful CTR.

14. A system for optimizing an advertisement campaign comprising:
- an advertiser providing an advertisement and advertisement information;
- a publisher providing available ad space for advertisements; and
- an ad correlator configured to analyze real-time display data, wherein the display data comprises a popularity, the ad correlator comprising:
  - a monitor that tracks the real-time display data for the advertisement;
  - an analyzer that receives the advertisement information, information about the available ad space, and the real-time display data for generating a correlation between the advertisement and the available ad space, wherein the correlation is based on an ad placement factor, an ad accounting factor, and a profile factor; and
  - a recommender that provides a recommendation for displaying the advertisement based on the correlation analysis wherein the recommendation comprises a similar advertisement to display or alternate ad space in which to display the advertisement.

15. The system of claim 14 wherein the display data comprises a click-through rate (CTR).

16. The system of claim 14 wherein the advertisement information comprises a category.

17. The system of claim 16 wherein the available ad space in which the advertisement is displayed is related to the category.

18. The system of claim 16 wherein the correlation between the advertisement and the available ad space is based on a category of the advertisement and a category of the available ad space.

19. The system of claim 18 wherein a category of the alternate ad space correlates with the category of the advertisement.

20. The system of claim 14 wherein the advertisement and the similar advertisement are both part of the advertisement campaign.

* * * * *